United States Patent [19]

Watanabe et al.

[11] Patent Number: 4,715,482

[45] Date of Patent: Dec. 29, 1987

[54] METHOD AND APPARATUS FOR CONTROLLING AN ELECTROMAGNETIC CLUTCH FOR USE ON A VEHICLE

[75] Inventors: Tomoyuki Watanabe; Takashi Shigematsu; Setsuo Tokoro; Takashi Hayashi, all of Susono, Japan

[73] Assignee: Toyota Jidosha Kabushiki Kaisha, Aichi, Japan

[21] Appl. No.: 754,949

[22] Filed: Jul. 15, 1985

[30] Foreign Application Priority Data

Nov. 20, 1984 [JP] Japan .................................. 59-244900
Apr. 3, 1985 [JP] Japan .................................... 60-70615

[51] Int. Cl.$^4$ ........................ F16D 37/02; B60K 41/02
[52] U.S. Cl. ........................... 192/0.032; 192/0.076; 192/0.096; 192/21.5; 192/103 R
[58] Field of Search ............... 192/0.032, 0.033, 0.034, 192/0.075, 0.076, 0.096, 21.5, 103 R

[56] References Cited

U.S. PATENT DOCUMENTS

| | | | |
|---|---|---|---|
| 3,163,272 | 12/1964 | Baumann | 192/21.5 X |
| 3,203,518 | 8/1965 | Peras | 192/103 R |
| 4,449,617 | 5/1984 | Sakakiyama et al. | 192/0.033 |
| 4,457,411 | 7/1984 | Hiramatsu | 192/0.076 |
| 4,480,732 | 11/1984 | Takano | 192/0.076 X |
| 4,550,816 | 11/1985 | Sakakiyama | 192/0.076 X |

FOREIGN PATENT DOCUMENTS

| | | | |
|---|---|---|---|
| 58-567 | 5/1983 | Japan . | |
| 2084280 | 4/1982 | United Kingdom | 192/21.5 |
| 2093618 | 9/1982 | United Kingdom | 192/103 R |

Primary Examiner—Rodney H. Bonck
Assistant Examiner—Richard M. Lorence
Attorney, Agent, or Firm—Parkhurst & Oliff

[57] ABSTRACT

A method and an apparatus of controlling an electromagnetic clutch incorporated in a power transmission system of a vehicle to transmit an output of an engine to the drive wheels of the vehicle is disclosed. An amount of electric current applied to the clutch is regulated to control an engaging action of said electromagnetic clutch, based on either a variation in rotating speed or torque of an output shaft of the electromagnetic clutch, or based on the frequency or number of variations per unit time in rotating speed or torque of the output shaft, as compared with the frequency or number of ignitions or combustions per unit time of the engine. In this way a variation in output torque of the engine is absorbed by the electromagnetic clutch for improved drivability, while a transmission power loss in the clutch is kept to a minimum for maximum fuel economy.

11 Claims, 18 Drawing Figures

METHOD AND APPARATUS FOR CONTROLLING AN ELECTROMAGNETIC CLUTCH FOR USE ON A VEHICLE

BACKGROUND OF THE INVENTION

The present invention relates in general to a method and an apparatus for controlling an electromagnetic clutch for use on an automotive vehicle, and more particularly to an improved technique by which the electromagnetic clutch is controlled so as to absorb a variation in output torque of the engine for improved drivability of the vehicle, yet with a minimum power loss in the electromagnetic clutch for economical operation of the engine.

For improved fuel economy of a vehicle engine, it has been known in the art to operate the engine at a relatively low speed with a relatively high torque by controlling or changing a speed ratio of the transmission. When the engine is operated in such condition, i.e., in a low-speed high-torque mode, the ignition period or cycle time of the engine tends to be long and consequently the engine suffers increased periodic variations in its output torque, whereby the drivability of the vehicle is degraded due to vibrations and noises which are caused by the periodic variations of the engine torque. In such arrangement, the average output torque of the engine is sufficient to drive the vehicle. However, there remains a problem of drivability when the engine is run at speeds in a relatively low range.

In the meantime, an electromagnetic clutch using a mass of magnetic powder was developed, as disclosed in Japanese Patent Application which was laid open in 1983 under Publication No. 58-657. Such an electromagnetic clutch is disposed between a vehicle engine and a transmission to transmit an output of the engine to the transmission. The clutch is controlled so that a rotating speed of its output shaft whose torque is transmitted to the transmission is lower than a rotating speed of its input shaft by a predetermined amount which is greater than a magnitude of variation in the rotating speed of the input shaft (variation from the average speed) which is caused by periodic variations of the torque of the input shaft. Namely, a slight amount of slip which gives a speed differential between the input and output shafts, is positively given to the electromagnetic clutch, so that a variation in output torque of the engine may be absorbed or accommodated by the clutch, in order to permit the engine to be operated in a low-speed high-torque mode with a high fuel economy, while maintaining a high level of drivability of the vehicle.

In the above-described arrangement for controlling the electromagnetic clutch, however, it is difficult for various reasons, to achieve an intricate control of an amount of slippage between the input and output shafts of the clutch, for absorbing the torque variation of the engine while minimizing the transmission power loss within the clutch.

Stated in greater detail, the magnitude of the engine torque variation varies depending upon current levels of speed and torque, and other specific operating conditions of the engine. Consequently, the control to maintain a constant amount of slip of the electromagnetic clutch (constant speed difference between its input and output shafts) does not make it possible to simultaneously accomplish the minimization of the power loss and the absorption of the engine torque variation, in the engine range of the varying operation conditions of the engine. With a constant amount of slip, the clutch slips too much and the fuel economy of the engine is lowered when the engine is operated with a relatively small level of variation in its output torque. If the amount of slip is reduced, on the contrary, the clutch is not able to sufficiently absorb the engine torque variation and the drivability of the vehicle is lowered when the engine is operated with a relatively large torque.

To solve the above inconveniences, it is considered to control the transmission torque of the electromagnetic clutch so that the amount of slip of the clutch is varied based on the detected output conditions of the engine. In this case, the amount of slip of the clutch may be optimized to the varying magnitude of variation in the engine torque. However, this method is available only where the output characteristics of the engine are unchanged. That is, it is impossible to give the clutch an optimum amount of slip that meets the varying magnitude of the engine torque, when the clutch is used for different types of engines or when the same engine is subject to changes in operating conditions such as atmospheric pressure, temperature of cooling water, relative humidity of the atmosphere, amount of carbon deposit in combustion chambers, etc., or changes in output characteristics.

SUMMARY OF THE INVENTION

It is accordingly an object of the present invention to provide a method and an apparatus for controlling an electromagnetic clutch connected to a vehicle engine, wherein a variation in output torque of the engine is suitably absorbed by the electromagnetic clutch for maximum drivability of the vehicle, while a transmission power loss within the clutch is held to a minimum for maximum fuel economy of the engine.

According to one aspect of the present invention, there is provided a method of controlling an electromagnetic clutch incorporated in a power transmission system of a vehicle to transmit an output of an engine to drive wheels of the vehicle, so as to absorb a variation in output torque of the engine, wherein an engaging action of the electromagnetic clutch is controlled to adjust a clutch torque transmitted by the clutch, based on whether a variation in rotating speed or torque of an output shaft of the clutch is synchronized with an ignition period of the engine.

According to anothe aspect of the invention, the above-described method may be suitably practiced by an apparatus wherein the engaging action of the clutch is controlled such that the clutch torque is varied as a function of an amount of electric current to be applied to the clutch, the apparatus comprising: detecting means for detecting a variation in rotating speed or torque of an output shaft of the clutch; and current adjusting means for controlling the amount of electric current to be applied to the clutch, so that the amount of electric current is decreased when the variation in rotating speed or torque of the output shaft is detected by the detecting means, and increased when the variation in rotating speed or torque of the output shaft is not detected by the detecting means.

In the method and apparatus as described above, the engaging action of the elctromagnetic clutch and therefore the clutch torque transmitted by the clutch are controlled depending upon whether the waveform representative of variations in rotating speed or torque of the output shaft of the clutch is in timed relation with the ignition period of the engine. Accordingly, the electromagnetic clutch is given an optimum amount of slip, irrespective of specific output conditions of the engine such as the engine speed and torque, irrespective of operating conditions of the engine such as atmospheric pressure, temperature of cooling water, relaive humidity of the atmosphere, and amount of carbon deposit in combustion chambers, irrespective of changing output characteristics of the engine, and irrespective of specific types of the engine.

In a method according to a further aspect of the invention, a frequency of variations in rotating speed or torque of the output shaft of the electromagnetic clutch is compared with an ignition frequency of the engine, and the engaging action of the clutch is controlled to adjust the clutch torque, based on whether the frequency of variations in rotating speed or torque of the output shaft is coincident with the ignition frequency.

According to a still further aspect of the invention, the above method may be suitably practiced by an apparatus wherein the clutch torque is varied as a function of an amount of electric current to be applied to the clutch, the apparatus comprising: first detecting means for detecting the ignition frequency of the engine; second detecting means for detecting the frequency of variations in rotating speed or torque of the output shaft of the clutch; and current adjusting means for controlling the amount of electric current, such that the amount of electric current is reduced when the detected frequency of variations is coincident with the detected ignition frequency, and increased when the detected frequency of variation is not coincident with the detected ignition frequency.

In the above-described method and apparatus, the clutch torque is reduced when the detected frequency of speed or torque variations in the output shaft is coincident with the detected ignition frequency, while the clutch torque is increased when the detected frequency of speed or torque variations is not coincident with the detected ignition frequency. Hence, the clutch torque is controlled so that the timed relation between the engine combustions and the speed or torque variations in the output shaft of the clutch is slightly lost. Accordingly, the amount of slip in the electromagnetic clutch is kept at an optimum level suitable for absorbing the engine torque variation.

It is noted that the speed variations and torque variations of the output shaft of the clutch both take place in timed relation with the ignition timing of the engine. Although the speed variations and the torque variation are different in phase, both variations are represented by the same waveform. Therefore, the speed variations and the torque variations, or the speed variation frequency and the torque variation frequency, may be interchangeably used as variables which are compared with the ignition period or cycle time of the engine.

In accordance with another aspect of the invention, there is provided a method of controlling an electromagnetic clutch incorporated in a power transmission system of a vehicle to transmit an output of an engine to drive wheels of the vehicle, so as to absorb a variation in output torque of the engine, wherein the number of ignitions per unit time of the engine is compared with the number of variations per unit time in torque of an output shaft of the clutch, and an engaging action of the clutch is controlled to adjust a clutch torque transmitted by the clutch, such that a difference between the number of ignitions of the engine and the number of variations in torque of the output shaft coincides with a predetermined reference value.

In accordance with a yet another aspect of the invention, the above-described method may be suitably practiced by an apparatus wherein the clutch torque is varied as a function of an amount of electric current to be applied to the clutch, the apparatus comprising: first detecting means for detecting the number of ignitions per unit time of the engine; second detecting means for detecting the number of variations per unit time in torque of the output shaft of the clutch; and current adjusting means for controlling the amount of electric current such that a difference between the detected number of ignitions of the engine and the detected number of variations in torque of the output shaft coincides with a predetermined reference value.

In the method and apparatus described above, the clutch torque is controlled so that the difference between the detected number of the engine ignitions per unit time and the detected number of torque variations per unit time of the output shaft of the clutch is equal to the predetermined reference value. In this arrangement, the variation in output torque of the engine may be suitably absorbed or accommodated by the electromagnetic clutch while the transmission power loss of the clutch is held at a minimum level. Accordingly, the engine may be operated with a high fuel economy, and a considerably high degree of drivability is maintained even when the engine is operated with a comparatively large variation in its output torque.

The above-indicated predetermined reference value is determined so as to permit maximum absorption of the output torque variation of the engine, with substantially no power loss within the electromagnetic clutch. Consequently, the variation in the output torque of the engine may be suitably absorbed by the clutch, irrespective of the varying operating conditions of the engine, and irrespective of the specific type of the engine. The reference value may be adjusted based on the current speed of the engine.

BRIEF DESCRIPTION OF THE DRAWING

The foregoing and other objects, features and advantages of the present invention will be better understood from reading the following detailed description of preferred embodiments of the invention, when considered in conjunction with the accompanying drawing, in which.

DETAILED DESCRIPTION OF THE PREFERRED EMBODIMENTS

The present invention will be described in detail, by reference to the accompanying drawings.

Figure 1:
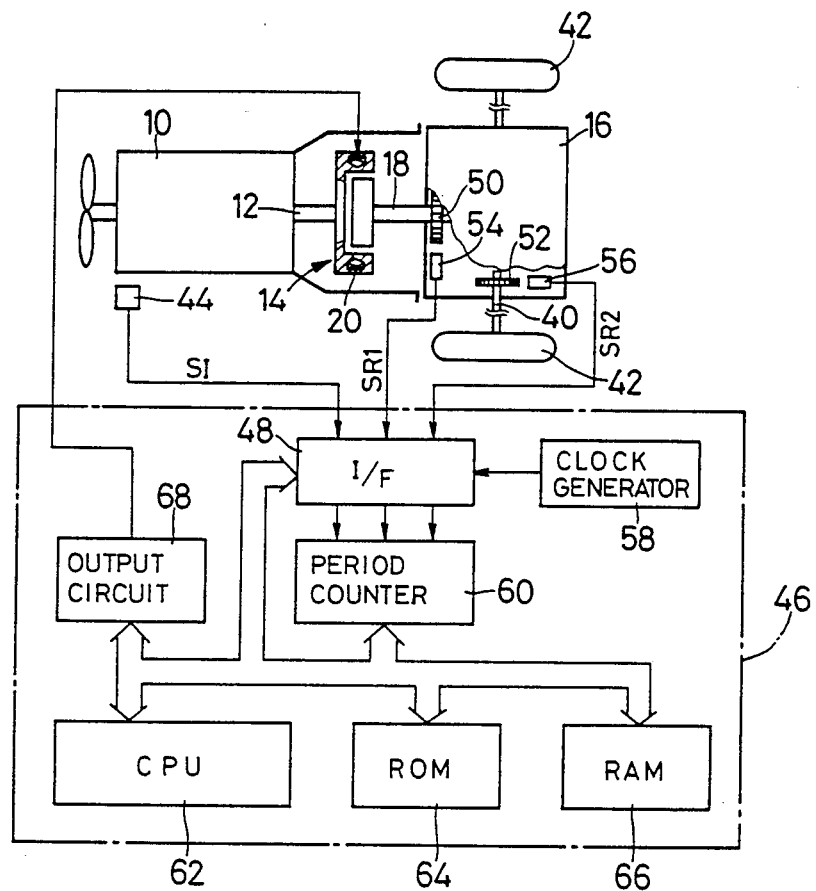
FIG. 1 is a block diagram of one embodiment of a control apparatus of the invention.
Figure 2:
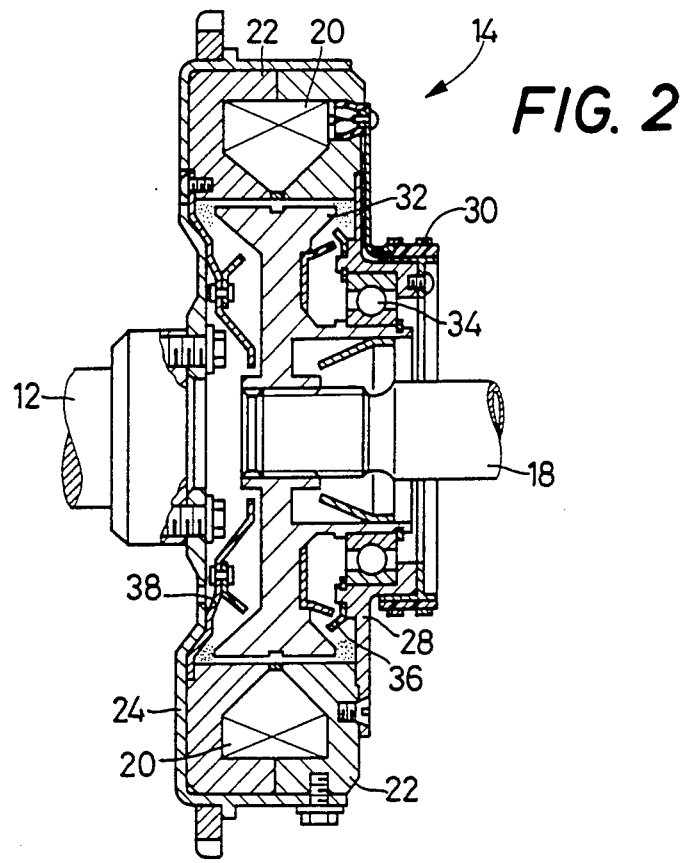
FIG. 2 is an elevational view in cross section of an electromagnetic clutch which is controlled by the control apparatus of FIG. 1.
Figure 3:
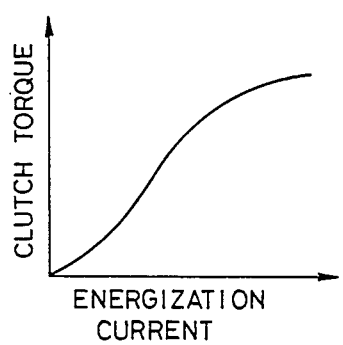
FIG. 3 is a graphical representation showing an example of power transmission characteristics of the electromagnetic clutch of FIG. 2.

Referring first to FIG. 1, there is shown an electromagnetic clutch 14 which connects a crankshaft 12 of a vehicle engine 10 and an input shaft 18 of a transmission assembly 16. As described later in detail, the electromagnetic clutch comprises a driving rotary member on its input side, and a driven rotary member on its output side, so that these rotary members engage with each other upon energization of a solenoid 20 to produce a magnetic force. The produced magnetic force causes a gap between the rotary members to be filled with a mass of magnetic powder, whereby a torque corresponding to an amount of electric energization current of the solenoid 20 is transmitted from the driving rotary member to the driven rotary member, according to given transmission characteristics. The structural arrangement of the electromagnetic clutch 14 is illustrated in FIG. 2, wherein an annular yoke 22 as the driving rotary member is connected to the crankshaft 12 via an outer member 24. The solenoid 20 of annular shape is embedded in the annular yoke 22 and is supplied with an energization current via a slip ring 30. The slip ring 30 is secured to a first labyrinth member 28 which rotates with the yoke 22. The driven rotary member in the form of a rotor 32 is supported by the first labyrinth member 28 via a bearing 34, such that the rotor 32 is concentric with, and rotatable relative to the yoke 22. The rotor 32 engages the end portion of the input shaft 18 by means of a spline. The first labyrinth member 28 is provided with an annular flange 36, while the yoke 22 is provided, on the side of the crankshaft 12, with a second labyrinth member 38 which has another annular flange similar to the annular flange 36. The second labyrinth member 38 cooperates with the annular flange 36 to define a substantially enclosed annular space which accommodates the magnetic powder mass. Upon energization of the solenoid 20, the previously indicated gap between the outer circumference of the rotor 32 and the inner circumference of the yoke 22 is filled with the magnetic powder mass, and the particles of the magnetic powder are tightly bonded together so that the powder mass contacts the outer and inner surfaces of the rotor 32 and the yoke 22. Thus, the rotary motion of the crankshaft 12 is transmitted to the input shaft 18 of the transmission assembly 16 by the electromagnetic clutch 14, such that a clutch torque transmitted by the clutch 14 to the input shaft 18 corresponds to an amount of energization current applied to the solenoid 20. As is apparent from the foregoing description, the crankshaft 12 and the input shaft 18 act as input and output shafts of the electromagnetic clutch 14, respectively. In this connection, a curve of FIG. 3 represents an example of a relation between the clutch torque transmitted by the clutch 14, and the amount of energization current of the solenoid 20.

Referring back to FIG. 1, the transmission assembly 16 comprises a plural-step transmission or a stepless transmission equipped with an auxiliary transmission, and a final drive assembly including a differential unit. The transmission assembly 16 transmits a torque of its input shaft 18 to drive wheels 42 of a vehicle through an axle 40. The engine 10 is provided with an ignitor 44 which generates an IGNITION signal SI corresponding to an ignition pulse aplied to produce a spart to ignite a fuel charge in the engine 10. The IGNITION signal SI is applied to an I/F circuit 48 in a controller 46, so that the rotating speed of the crankshaft 12 is detected. To the input shaft 18 and axle 40, there are fixed speed detector gears 50, 52, respectively, each of which has a plurality of detector teeth on its outer circumference, for sensing the rotating speeds of the input shaft 18 and axle 40. Adjacent to these speed detector gears 50, 52, there are disposed speed sensors 54, 56, respectively, which generate ROTATION signals SR1 and SR2 in the form of pulses whose frequencies correspond to the rotating speeds of the input shaft 18 and axle 40, respectively. The ROTATION signals SR1, SR2 are fed to the I/F circuit 48. The pulses of the ROTATION signals SR1, SR2 are produced in response to passage of the detector teeth across the speed sensors 54, 56. Since the speed sensor 54 is assigned to detect not only the rotating speed of the input shaft 18, but also variation in the rotating speed, the corresponding speed detector gear 50 should preferably have at least 10 detector teeth.

A clock generator 58 applies clock pulses of a relatively high frequency to the I/F circuit 48. The I/F circuit 48 applies to a PERIOD counter 60 the clock pulses whose numbers correspond to periods of the IGNITION and ROTATION signals SI, SR1 and SR2. Based on the numbers of the received clock pulses, the PERIOD counter determines periods of the IGNITION and ROTATION signals SI, SR1 and SR2.

The controller 46 is constituted by a so-called microcomputer which comprises a CPU 62, a ROM 64 and a RAM 66. The CPU 62 operates to process input data according to a program stored in the ROM 64, while utilizing a temporary storage function of the RAM 66, and supplies a controlled energization current to the solenoid 20 of the electromagnetic clutch 14 via an output circuit 68. The output circuit 68 includes a D/A converter and a voltage/current converter.

The operation of the present embodiment will be described.

Figure 4:
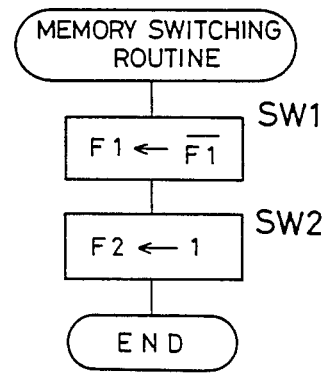
FIGS. 4, 5 and 6 are flow charts illustrating the operation of the control apparatus of FIG. 1.
Figure 5:
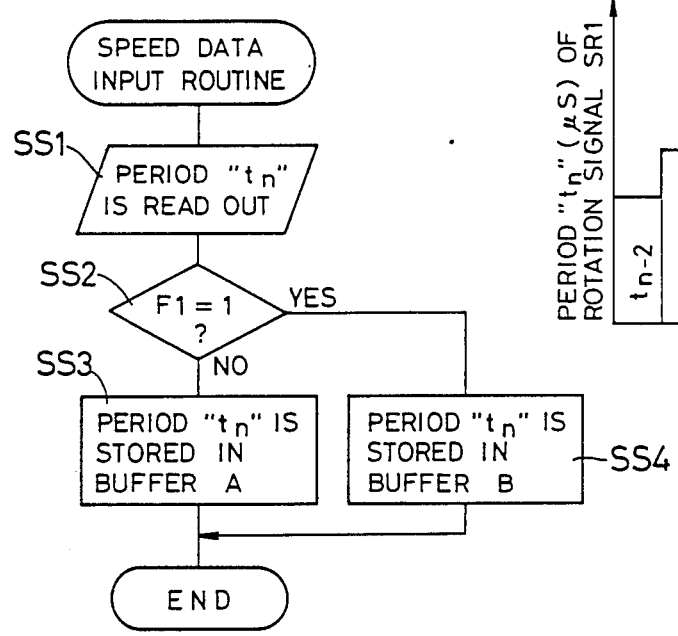
Figure 6:
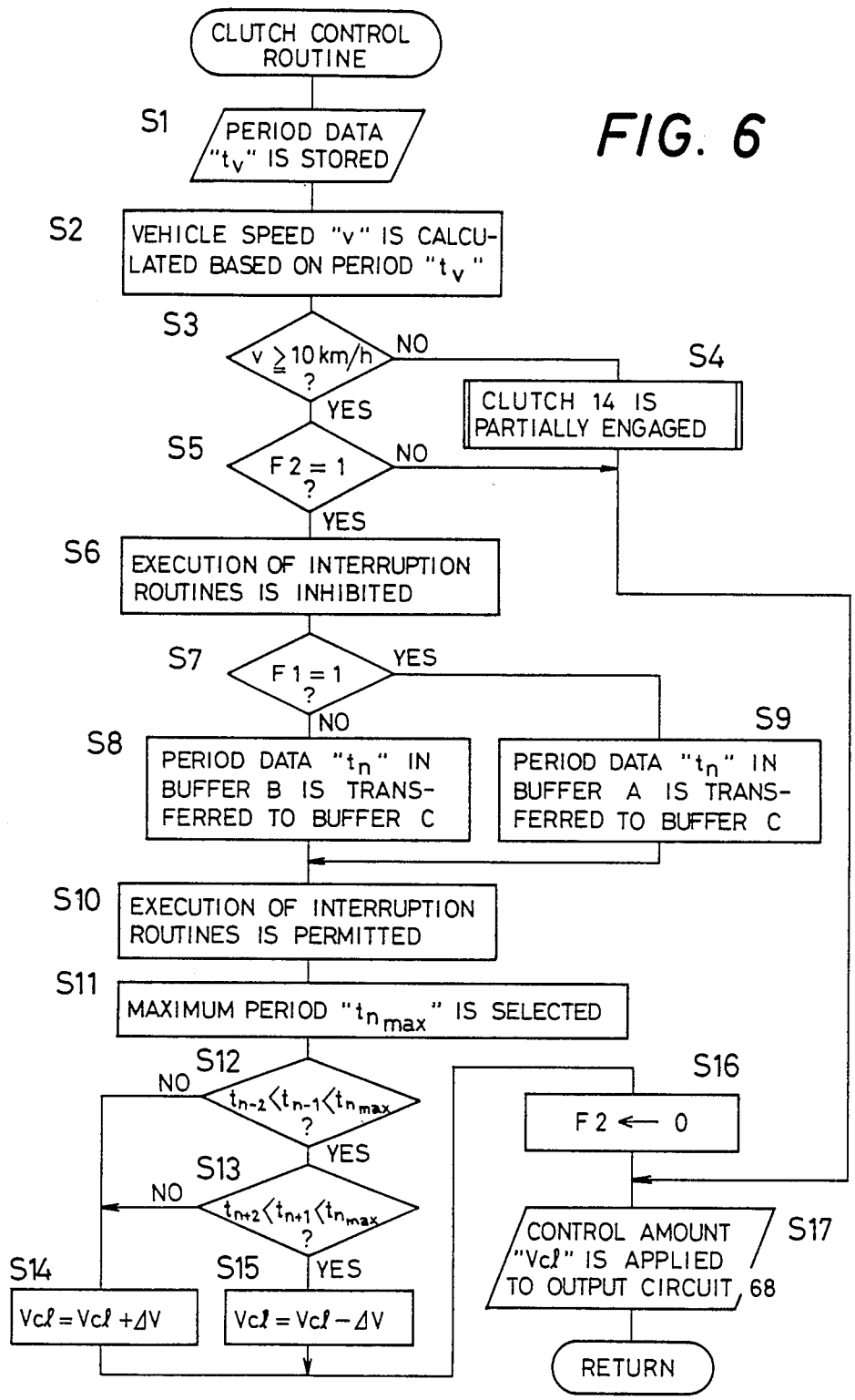

In the instant embodiment, a speed data input routine of FIG. 5 for storing speed data of the input shaft 18, and a memory switching routine of FIG. 4 for alternately selecting two memories (later described buffers A and B provided in the RAM 66) are executed as interruption routines while a clutch control main routine of FIG. 6 is interrupted. The speed data input routine is repeated at a relatively short interval which is determined in view of a calculation time necessary for the clutch control main routine. Further, the memory switches routine is repeated at an interval which is determined in view of the interval of the speed data input routine. Stated in more detail, the memory switching routine of FIG. 4 is effected in preference to the clutch control main routine, for example, each time the IGNITION signal SI representative of an ignition or combustion of the engine 10 is generated, or for every second IGNITION signal SI. In the memory switching routine, step SW 1 is executed to reverse the current content of a flag F1 (which will be described), and step SW2 is carried out to set the content of a flag F2 (which will be described) to "1". The flag F1 serves to alternately select one of the buffers A and B in which the speed data of the input shaft 18 is to be stored. The flag F2 indicates a state in which a new or updated amount of control of the clutch torque has not yet been determined based on a series of speed data already stored in the selected buffer A or B.

The speed data input routine of FIG. 5 is effected, for example, in response to the generation of each ROTATION signal SR1, and in preference to the clutch control main routine. In this routine, step SS1 is executed to read out the period "tn" of the ROTATION signal SR1 which has been determined by the PERIOD counter 60, and step SS2 is then executed to store the period "tn" in the buffer A or B which is selected by the flag F1. With this speed data input routine repeated in timed relation with the ROTATION signals SR1, a series of period data "tn" (speed data) of the input shaft 18 are stored one after another in the buffer A or B designated by the flag F1. The buffers A and B are alternately selected for a time span equal to a time interval between two consecutive ignitions of the engine 10, with the flag F1 changed from one state to the other in step SW1 of the memory switching routine. In this time span, a relatively large number of the period data "tn" of the ROTATION signals SR1 are stored in the selected buffer A or B. In this connection, it is noted that the speed of the input shaft 81 after each ignition of the engine is raised to its highest level and lowered to its lowest level at which the next combustion takes place to raise the speed to its highest level. Each cycle of storing the series of the period data "tn" in the selected buffer is started so that a period of time during which the speed is lowered and raised past the lowest level is wholly included in each storage cycle. In other words, the timing of each storage of the period data "tn" with respect to the ignition of the engine is determined so that the bottom portion of the waveform of the speed variation period data "tn" of the input shaft 18 does not bridge two consecutive ignition cycles of the engine 10.

Referring next to FIG. 6, the clutch control routine will be described. Initially, step S1 is executed to store in the RAM 66 a period "tv" of the ROTATION signal SR2 determined by the PERIOD counter 60. Step S1 is followed by step S2 wherein a vehicle speed "v" is calculated based on the read-out period "tv" and according to the following equation (1):

$$v = 1/tv.N \times 60 \text{ sec.} \times 60 \text{ min.} \times 2\pi r \times 10^{-3} \text{ km/h} \quad (1)$$

where,

N: Number of teeth of the speed detector gear 52 r: Radius of the drive wheels 42

In the next step S3, the CPU 62 checks the calculated vehicle speed "v" to judge whether the electromagnetic clutch 14 should be partially engaged, or should be controlled so as to absorb a variation in output torque of the engine 10 with substantially no slip. For example, where the vehicle speed "v" is lower than 10 km/h, the CPU 62 goes to step S4 to control the electromagnetic clutch 14 for partial engagement thereof. In the partial engagement mode, a control amount "Vcl" (e.g., a control voltage to be applied to the voltage/current converter in the output circuit 68) corresponding to the energization current of the solenoid 20 is determined by the following equation (2):

$$Vcl = (Ne - Nidl) \times K \quad (2)$$

where,

Ne: Speed of the engine 10

Nidl: Idling speed of the engine 10

K: Gain, i.e., constant or function of throttle opening angle or target speed of the engine 10.

Where the CPU 62 judges in step S3 that the vehicle speed "v" is equal to or higher than 10 km/h, step S3 is followed by step S5 to check if the content of the flag F2 is "1" or not. If the content of the flag F2 is not "1", that is, if the storage of the period data "tn" into the selected buffer A or B has not been completed, the CPU 62 goes to step S17 wherein the control amount "Vcl" determined in the preceding cycle is kept unchanged and continuously applied to the solenoid 20 of the clutch 14. In the case where the content of the flag F2 is "1", namely, where the storage of the period data "tn" in the buffer A or B has been completed but a control amount for the solenoid 20 has not been determined based on the period data "tn", step S5 is followed by step S6 to inhibit the execution of the previously indicated interruption routines, i.e., memory switching routine of FIG. 4 and speed data input routine of FIG. 5, until step S10 is executed. During this period of inhibition, the CPU 62 executes steps S7 through S9. In step S7, the CPU 62 judges whether the content of the flag F1 is "1" or not. If the content of the flag F1 is "0" and the buffer A is currently selected for storage of the period data "tn" therein, step S7 is followed by step S8 wherein the period data "tn" which has been stored in the previously selected buffer B are transferred to a buffer C. If the content of the flag F1 is "1", the CPU 62 goes to step S9 in which the period data "tn" already stored in the buffer A are transferred to the buffer C.

Figure 7:
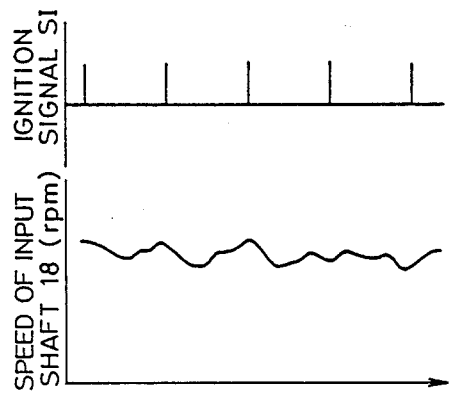
FIG. 7 is a view showing an irregular state of a waveform representative of a variation in the rotating speed of the output shaft of the electromagnetic clutch.

In step S11, the CPU 62 selects the maximum period "tn max" from among the series of the period data "tn" stored in the buffer C. Then, step S11 is followed by step S12 to check if the period "tn max" is greater than the preceding period "tn-1" and to check if the period "tn-1" is greater than the preceding period "tn-2". Namely, step S12 is executed to check whether the values of the successive periods "tn" increase progressively in the order of "tn-2", "tn-1" and "tn max". If the result of the checking in step S12 is affirmative, the CPU 62 goes to step S13 to check if the period "tn max" is greater than the following period "tn+1" and to check if the period "tn+1" is greater than the following period "tn+2". In other words, step S13 is executed to check whether the values of the successive periods "tn" decrease progressively in the order of "tn max", "tn+1" and "tn+2". In the event that the result of the checking in step S12 or in step S13 is negative, it means that the rotating speed of the output shaft of the electromagnetic clutch 14, i.e., of the input shaft 18 of the transmission assembly 16, is not varied in timed relation with the ignition timing or period of the engine 10. That is, the waveform representative of the speed variation of the input shaft 18 is not synchronized with the generation of the IGNITION signals SI or combustion of the engine 10, as indicated in FIG. 7. In this case, therefore, the CPU 62 goes to step S14 wherein a predetermined small value $\Delta V$ is added to the preceding control value "Vcl" to increase and update the control voltage to adjust the energization current of the solenoid 20 of the clutch 14. Stated more specifically, when the speed variation waveform of the input shaft 18 is not synchronized with the ignition timing of the engine 10, it indicates that the electromagnetic clutch 14 currently undergoes an excessive amount of slip and suffers an unnecessarily large power loss. In this condition, therefore, the energization current of the solenoid 20 is increased to reduce the amount of slip of the electromagnetic clutch 14.

Figure 8:
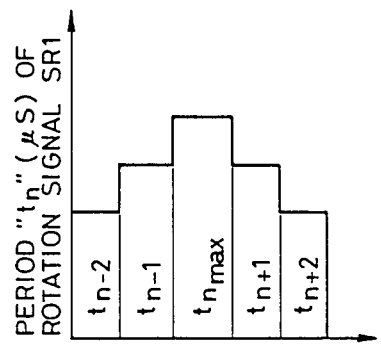
FIG. 8 is a graph showing successive pulse periods of rotation signals of the output shaft of the electromagnetic clutch.
Figure 9:
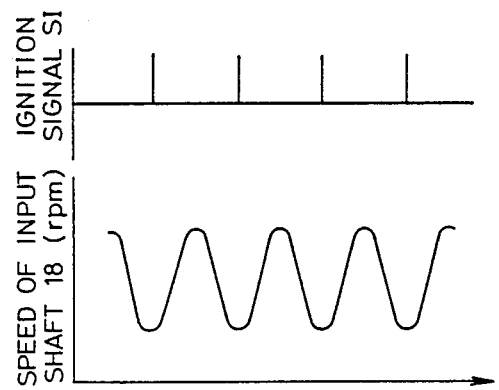
FIG. 9 is a graph showing a waveform representative of periodic variations in the rotating speed of the output shaft of the clutch where the period of the speed variation waveform is coincident with an ignition frequency of a vehicle engine.

In the case where the results of the checking in steps S12 and S13 are both affirmative, namely, if the periods "tn" prior to the maximum period "tn max" increase progressively to the maximum level "tn max", while the periods "tn" following the period "tn max" decrease progressively, as indicated in FIG. 8, then the CPU 62 judges that the speed variation waveform of the input shaft 18 is synchronized with the timing in which the IGNITION signals SI are generated, as indicated in FIG. 9. In this condition, the CPU 62 goes to step S15 in which a predetermined value $\Delta V$ is subtracted from the control amount "Vcl" which was determined in the preceding cycle, whereby the control amount "Vcl" is updated. Described in more detail, where the speed variation waveform of the input shaft 18 is synchronized with the IGNITION signals SI and therefore with the combustion timing of the engine 10, it means that the electromagnetic clutch 14 tends to undergo a comparatively small amount of slip. Accordingly, the electromagnetic clutch 14 is in a state in which it is impossible to sufficiently absorb a variation in the output torque of the engine 10. Hence, the control voltage for the solenoid 20 is reduced to increase the amount of slip in the clutch 14. It is noted that the period "tn max" of FIG. 8 of the ROTATION signal SR1 corresponds to the bottom of the speed variation waveform of FIG. 9 of the input shaft 18.

In the present embodiment, means for executing steps S11 through S13 serves as means for detecting a variation in the rotating speed of the input shaft 18, i.e., of the output shaft of the electromagnetic clutch 14. Further, means for executing steps S14 and S15 serves as means for controlling a magnitude or amount of electric current to be applied to energize the solenoid 20, in order to adjust the engaging condition of the electromagnetic clutch 14, i.e., a torque transmitted by the clutch 14.

Then, the CPU 62 goes to step S16 to set the content of the flag F2 to "0", and to the previously indicated step S17 in which the updated control amount "Vcl" is applied to the output circuit 68. By repeating the above-described clutch control routine, the energization current applied to the solenoid 20 is controlled so that the speed variation of the input shaft 18 of the transmission assembly 16 takes a waveform which is intermediate between those of FIGS. 7 and 9. With the solenoid energization current thus controlled, the engaging condition of the electromagnetic clutch 14 is regulated so as to maintain an optimum amount of slip that allows sufficient absorption of a variation in the output torque of the engine 10, while minimizing the transmission power loss.

As described hitherto, the electromagnetic clutch 14 is controlled such that the torque to be transmitted by the clutch 14 is adjusted to maintain a condition wherein the synchronization or timed relation of the speed variation waveform with the combustion or ignition timing or period of the engine 10 is slightly lost. Stated the other way, the engaging condition and consequently the amount of slip of the electromagnetic clutch 14 is controlled through adjustment of the energization current of the solenoid 20, so that the speed variation period of the output shaft of the clutch 14 is neither strictly coincident with the ignition period of the engine 10, nor excessively deviated from the ignition period. As a result, the instant arrangement permits effective absorption of a variation in the output torque of the engine 10, and at the same time restrains the power loss within the clutch 14, irrespective of an actual output condition of the engine 10, specific type of the engine 10 (specific output torque characteristics thereof), changes in the operating environments of the engine 10 such as atmospheric pressure, cooling water temperature, relative humidity of the atmosphere, amount of carbon accumulation in the combustion chambers, etc. Consequently, a common control program may be utilized for economical control of the transmission torque of the electromagnetic clutch 14, for different types of the engine 10, and for various and changing operating conditions of the engine.

While the foregoing embodiment uses the periods "tn" of the ROTATION signals SR1 to obtain the speed variation waveform of the input shaft 18, it is also possible to detect a speed variation frequency of the input shaft 18 and control the electromagnetic clutch 14 so that the corresponding relation of this speed variation frequency with the ignition frequency of the engine 10 is slightly lost.

Figure 10:
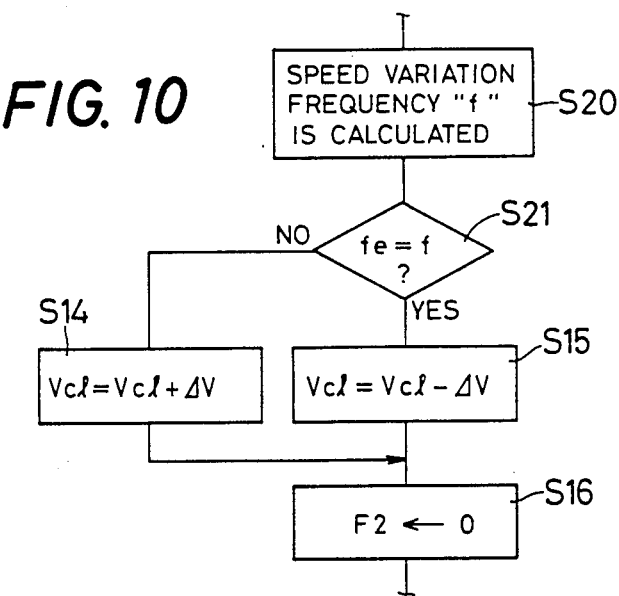
FIG. 10 is a fragmentary flow chart showing another embodiment of the invention.

Referring to FIG. 10, there will be described the above-indicated modified embodiment wherein the speed variation frequency of the input shaft 18 is compared with the ignition frequency of the engine 10, In the interest of brevity and simplification, the same reference characters as used in the preceding embodiment will be used, and the repeated description of the corresponding elements will not be provided.

In this embodiment, steps S20 and S21 of FIG. 10 are executed in place of steps S11 through S13 of the preceding embodiment. Described more specifically, step S20 is executed to calculate a frequency "f" of the speed variation of the input shaft 18, based on the series of the period data "tn" of the ROTATION signals SR1 which have been transferred to the buffer C. Step S20 is followed by step S21 in which the calculated speed variation frequency "f" is compared with an ignition frequency "fe" of the engine 10. In the case where these two frequencies "f" and "fe" coincide with each other, step S21 is followed by the previously described step S15 wherein the control amount "Vcl" is reduced. However, if the speed variation frequency "f" is not coincident with the ignition frequency "fe" of the engine 10, step S21 is followed by the previously described step S14 wherein the control amount "Vcl" is increased to reduce the amount of slip of the clutch 14. In this embodiment, means for executing step S20 serves as means for detecting the speed variation frequency "f"

of the input shaft 18, and means for executing steps S21, S14 and S15 serves as means for controlling the magnitude of the electric current applied to energize the solenoid 20. While the amount of slip of the electromagnetic clutch 14 is judged by means of comparison of the speed variation frequency "f" with the ignition frequency "fe", it is also possible to compare the speed variation frequency "f" with a combustion frequency of the engine 10, to check the clutch 14 for optimum amount of slip. In either case, substantially the same results as obtained in the preceding embodiment are provided.

In the preceding embodiments, the control of the clutch 14 for maintaining an optimum slip is effected based on the speed variation waveform (period data "tn") or the speed variation frequency "f" of the input shaft 18.

Figure 11:
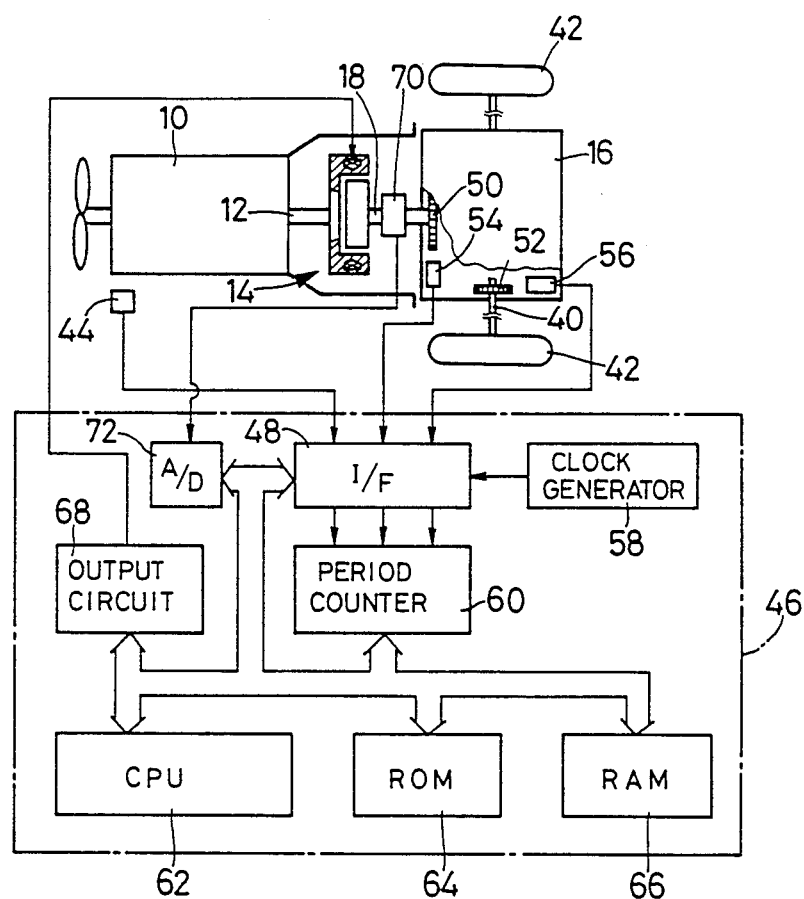
FIG. 11 is a diagram corresponding to FIG. 1, showing a further embodiment of the invention.

However, it is possible to detect a torque variation waveform of frequency "ft" of the input shaft 18, and compare this waveform of frequency "ft" with the ignition period or frequency "fe" of the engine 10. Although this torque variation waveform is slightly shifted in phase from the speed variation waveform of FIG. 9, the former is similar in form to the latter. Accordingly, the above modification to use the torque variation waveform or frequency "f" provides essentially the same results as obtained in the preceding embodiments. As shown in FIG. 11, this modified arrangement employs a torque sensor 70 to detect an actual torque of the input shaft 18, and an A/D converter 72 to convert the output signal of the torque sensor 70 into a digital value. In the case where the torque variation waveform is used, the operation to control the electromagnetic clutch 14 is performed through execution of steps similar to those shown in FIGS. 4, 5 and 6. In this case, however, steps SS3 and SS4 of FIG. 5 are replaced by the steps in which the buffers A and B store torque variation data of the input shaft 18, rather than the speed variation period data "tn" of the ROTATION signal SR1. More precisely, the buffers A and B store data representative of values of the torque of the input shaft 18 upon generation of each ROTATION signal SR1. In this case, means for executing the steps corresponding to steps S11 through S13 of FIG. 6 serves as means for detecting the torque variation of the input shaft 18.

In the case where the torque variation frequency "f" is used, steps similar to the steps of FIG. 10 are executed. In this case, however, step S20 of FIG. 10 is replaced by a step in which the torque variation frequency "ft" of the input shaft 18 is calculated. Further step S21 of FIG. 10 is replaced by a step in which the calculated torque variation frequency "ft" is compared with the ignition frequency "fe" of the engine 10. In this case, therefore, means for executing the steps corresponding to step S20 of FIG. 10 serves as means for detecting the torque variation frequency "f" of the input shaft 18, and means for executing the steps corresponding to the steps S21, S14 and S15 serves as means for controlling the magnitude of the energization current of the solenoid 20.

As described hitherto, the solenoid 20 of the electromagnetic clutch 14 is controlled based on the speed variation period "tn" or torque variation period of the input shaft 18 as compared with the ignition period of the engine 10, or based on the speed variation frequency "f" or torque variation frequency "ft" of the input shaft 18 as compared with the ignition frequency "fe" of the engine 10. Since the frequency is inversely proportional to the period, the control of the clutch 14 based on the frequency provides substantially the same results as the control based on the period.

A still further embodiment of the invention will be described.

Figure 13:
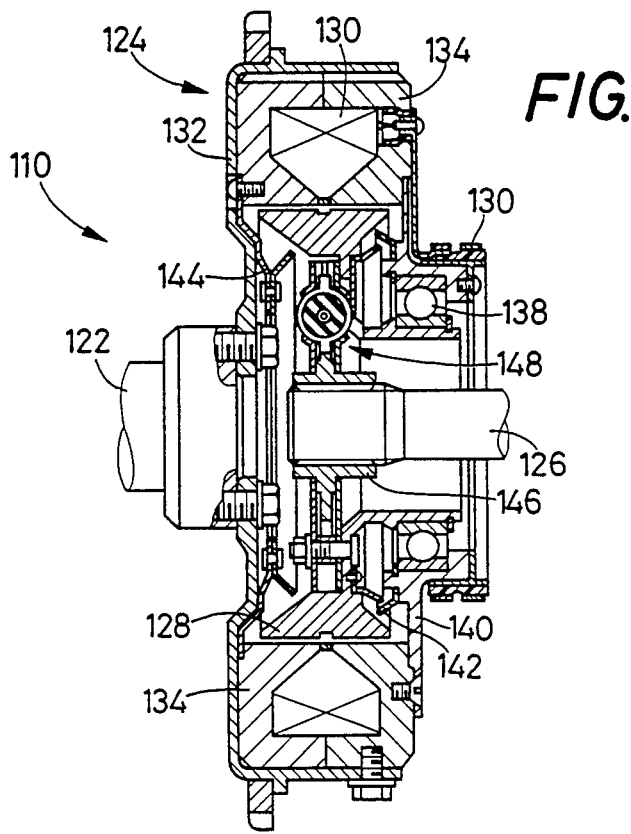
FIG. 13 is an elevational view in cross section of the electromagnetic clutch of the embodiment of FIG. 12.
Figure 12:
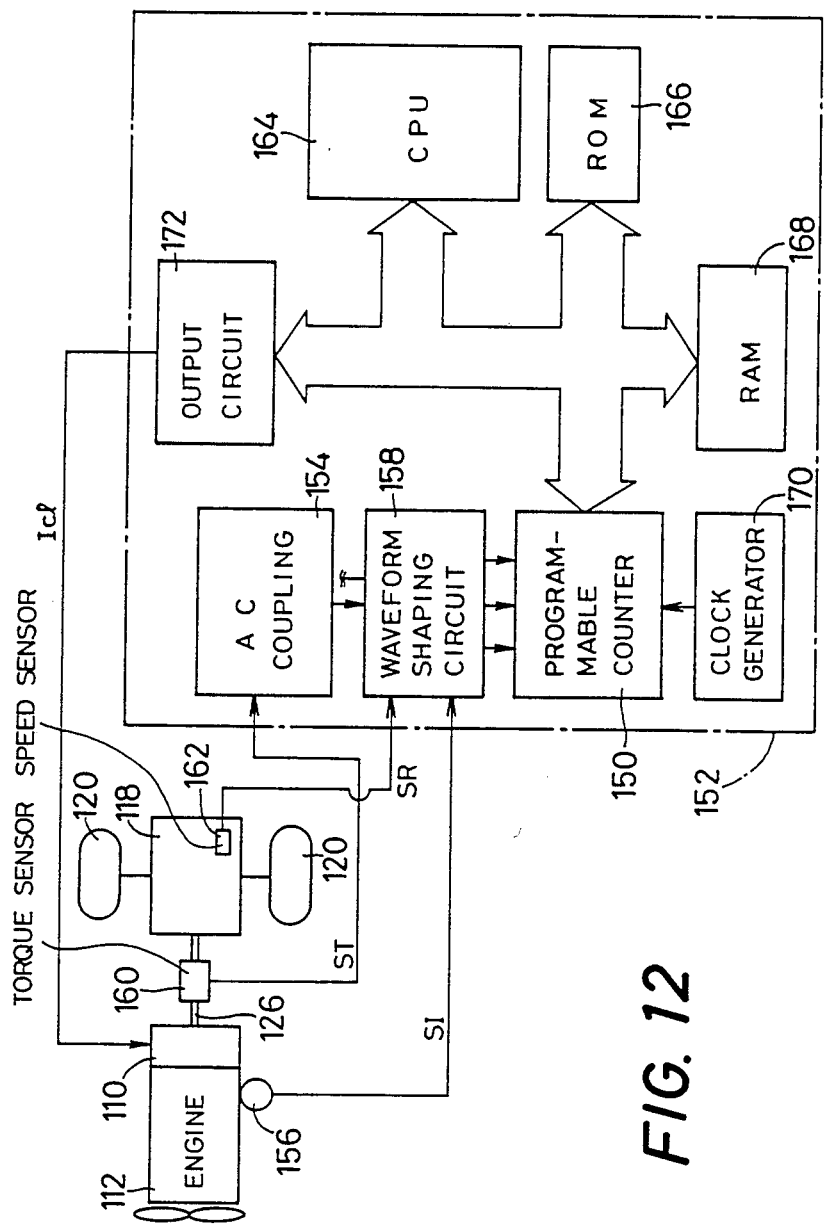
FIG. 12 is a diagram also corresponding to FIG. 1, showing a still further embodiment of the invention.
Figure 14:
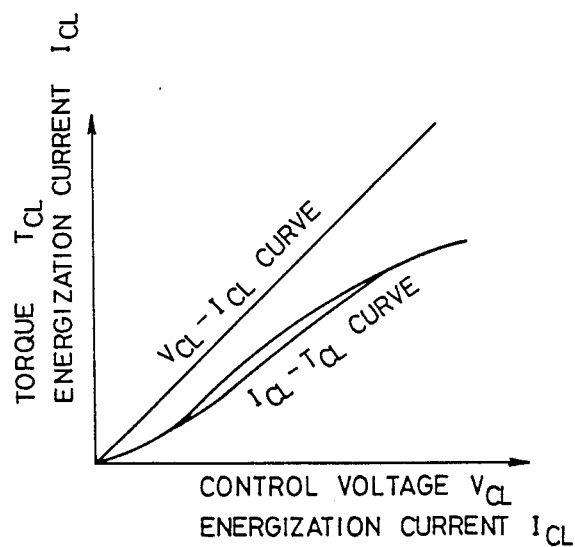
FIG. 14 is a graphical representation of power transmission characteristics of the electromagnetic clutch of FIG. 13.

FIG. 12 shows a control device for controlling an electromagnetic clutch 110 which connects a vehicle engine 112 to a transmission assembly 118 which includes a transmission and a final drive unit incorporating a differential device. Power of the engine 112 which is transmitted to the transmission assembly 118 via the clutch 110 is transmitted to drive wheels 120. As shown in detail in FIG. 13, the electromagnetic clutch 110 comprises a driving rotary member 124 connected to a crankshaft 122 of the engine 112, a driven rotary member in the form of a rotor 128 connected to an output shaft 126, and a solenoid 130 for changing the condition of a mass of magnetic powder accommodated between the driving rotary member 124 and the rotor 128, so that the torque transmitted by the clutch 110 is adjusted. The crankshaft 122 serves as an input shaft of the electromagnetic clutch 110. The driving rotary member 124 comprises an outer member 132 fixed to the crankshaft 122, and an annular yoke 134 secured to the inner surface of the outer member 132. The solenoid 130 of annular shape is embedded in the annular yoke 134 and is supplied with an energization current via a brush (not shown) of a slip ring 136 which is rotated with the yoke 134. Within the yoke 134, the rotor 128 is rotatably supported by a first labyrinth member 140 via a bearing 138. The first labyrinth member 140 is secured to one end face of the yoke 134 on the side of the output shaft 126, and is provided with an annular flange 142. This annular flange 142, and a second labyrinth member 144 secured to the other end face of the yoke 134, cooperate with each other to define a substantially enclosed annular space which accommodates the magnetic powder mass. Upon energization of the solenoid 130, a magnetic field is produced between the rotor 128 and the yoke 134, whereby an annular gap between the outer circumference of the rotor 128 and the inner circumference of the yoke 134 is filled with the magnetic powder mass. Thus, the rotary motion of the crankshaft 122 is transmitted to the output shaft 126, according to the current-torque characteristics as shown in FIG. 14. The output shaft 126 is coupled at its end to a hub 146 by means of a spline. The hub 146 is connected to the rotor 128 through a damper 148 which is provided to absorb an engagement shock of the clutch 110.

Referring back to FIG. 12, the engine 112 is provided with an ignitor 156 which produces an IGNITION signal SI corresponding to an ignition pulse applied to the engine 112. The IGNITION signal SI is applied to a waveform shaping circuit 158 in a controller 152. The output shaft 126 of the electromagnetic clutch 110 is provided with a torque sensor 160 which generates a TORQUE signal ST representative of a torque of the output shaft 126. The TORQUE signal ST is applied to an AC coupling 154. To detect a vehicle speed, a speed detector disk (not shown) is disposed on a shaft which is rotated with the drive wheels 120. This speed detector disk has a multiplicity of detector teeth on its circumference. Adjacent to the detector disk, there is disposed a speed sensor 162 which detects the passage of the detector teeth of the disk, and produces a ROTATION signal SR in the form of pulses whose number corresponds to the number of the detected detector teeth of the disk.

The ROTATION signal SR from the speed sensor 162 is fed to the waveform shaping circuit 158.

Figure 15:
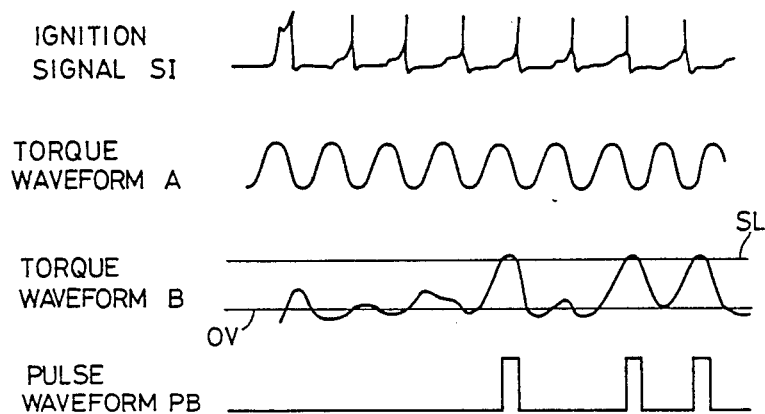
FIG. 15 is a view illustrating examples of various waveforms obtained in the embodiment of FIG. 12.

The AC coupling 154 transfers varying components $\tilde{T}$ of the TORQUE signal ST from the torque sensor 160 to the waveform shaping circuit 158. A TORQUE waveform A shown in FIG. 15 represents variations $\tilde{T}$ in the torque of the output shaft 126 of the electromagnetic clutch 110 while the crankshaft 122 is connected to the output shaft 126 without a slip in the electromagnetic clutch 110. A TORQUE waveform B shows variation $\tilde{T}$ in the torque of the output shaft 126 when the clutch 110 begins to slip. As described above, the waveform shaping circuit 158 receives the IGNITION signal SI (indicated at the top of FIG. 15) from the ignitor 156, the varying components $\tilde{T}$ of the TORQUE signal ST from the AC coupling 154, and the ROTATION signal ST from the speed sensor 162. These signals are shaped into rectangular pulse signals by the waveform shaping circuit 158, and the shaped pulse signals are applied to a programmable counter 150. For reliable detection of the number of variations in the torque value of the output shaft 126, a threshold level SL is provided for the TORQUE signal ST, as indicated in FIG. 15. This threshold level SL is set to be sufficiently higher than the noise level, and lower than the peak value of the torque variation waveform which corresponds to the firing of the engine 112. When the torque variation waveform exceeds the preset threshold level SL, a rectangular pulse indicative of a variation in the torque is generated by the waveform shaping circuit 158. A PULSE waveform PB at the bottom of FIG. 15 is a waveform which is obtained as a result of shaping the TORQUE waveform B. Thus, the waveform shaping circuit 158 serves as means for sensing a variation in the torque of the output shaft 126 of the clutch 110. The programmable counter 150 counts the numbers of clock pulses which are received from a clock generator 170 for each time interval of adjacent two pulse signals of the IGNITION signal SI and of the ROTATION signal SR. Based on the counted numbers of the clock pulses, the programmable counter 150 provides IGNITION period data "tig" of the IGNITION signal SI, and ROTATION period data "tout" of the ROTATION signal SR. The programmable counter 150 comprises an IGNITION counter for counting the number of ignitions of the engine 112 to provide IGNITION number data "Tig", and a TORQUE VARIATION counter for counting the number of variations in the torque of the output shaft 126, to provide TORQUE VARIATION number data "Tq". The IGNITION number data "Tig" is prepared based on the number of ignitions which is counted for a sampling time determined by a CPU 164 (which will be described). The TORQUE VARIATION number data "Tq" is prepared by counting the number of pulses of the PULSE waveform PB which are produced by the waveform shaping circuit 158 for the sampling time determined by the CPU 164. Thus, the programmable counter 150 serves as means for counting the number of variations in the torque of the output shaft 126 of the electromagnetic clutch 110.

The controller 152 is constituted by a so-called microcomputer, which serves as means for controlling an electric current applied to the solenoid 130 of the electromagnetic clutch 110. The controller 152 comprises the previously indicated programmable counter 150 and CPU 164, and a ROM 166, a RAM 168, and an output circuit 172, which are connected to each other by a data bus line. The CPU 164 operates to process the input data from the programmable counter 150, according to a program stored in the ROM 166, while utilizing a temporary storage function of the RAM 168. The CPU 164 supplies via the output circuit 172 a controlled energization current "Icl" to the solenoid 130 of the electromagnetic clutch 110. The output circuit 172 includes a D/A converter and an amplifier.

Figure 16:
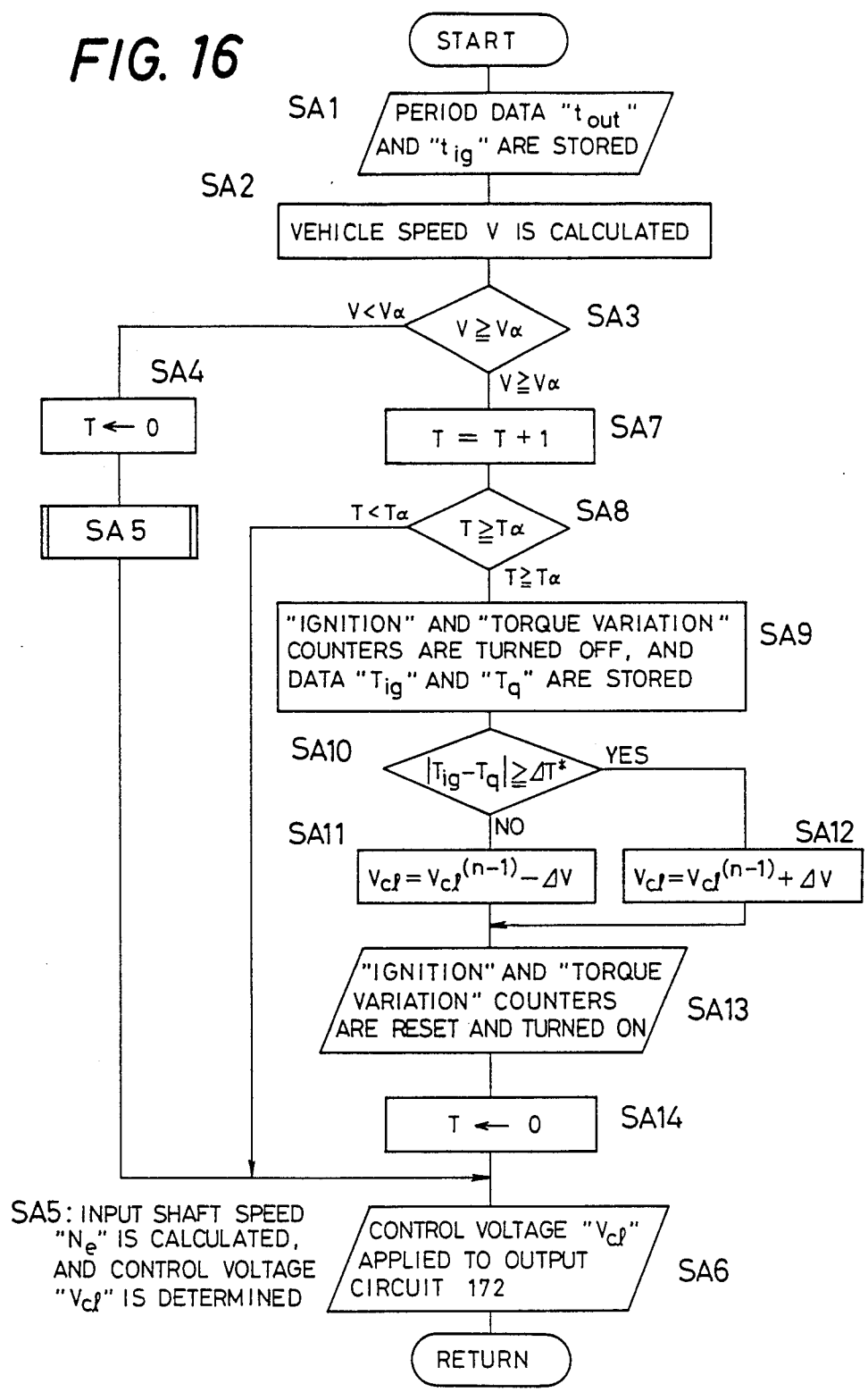
FIG. 16 is a flow chart showing the operation of the embodiment of FIG. 12.

The operation of the present embodiment will be described, by reference to the flow chart of FIG. 16 which depicts essential events of operation under control of the CPU 164.

Initially, the CPU 164 goes to step SA1 to store the ROTATION period data "tout" of the ROTATION signal SR, and the IGNITION period data "tig" of the engine 112. Step SA1 is followed by step SA2 in which a vehicle speed V is calculated according to the following equation (3):

$$V(Km/h) = 1/\text{tout} \times 1/n \times 60 \text{ sec.} \times 60 \text{ min.} \times 2\pi \times r_D \times 10^{-3} \quad (3)$$

where,
$r_D$: Radius of the drive wheels 120
n: Number of detector teeth of the detector disk Subsequently, the CPU 164 goes to step SA3 to check if the calculated vehicle speed V is greater than or equal to a predetermined value $V\alpha$ or not. This value $V\alpha$ is set, for example, at about 25 Km/h, and used as a boundary below which the electromagnetic clutch 110 is controlled in the partial engagement mode. In the case where the vehicle speed V is lower than the predetermined value $V\alpha$, the CPU 164 goes to step SA4 to reset a timer counter T, and then to step SA5 to calculate the rotating speed of the input shaft of the clutch 110, i.e., speed "Ne" of the engine 112, according to the following equation (4):

$$Ne(r.p.m.) = 1/\text{tig} \times \tfrac{1}{2} \times 60 \text{ sec.} \quad (4)$$

where, the engine 112 has four cylinders, and two ignition pulses are applied for each revolution of the engine 112.

Also in step SA5, the CPU 164 determines a control voltage "Vcl" according to the following equation (5):

$$Vcl = K(Ne - Nidl) \quad (5)$$

where,
Nidl: idling speed of the engine 112
K: Control factor determined by throttle opening angle, etc.

Step SA5 is folowed by step SA6 in which the determined control voltage "Vcl" is applied to the output circuit 172, whereby the energization current "Icl" is supplied from the output circuit 172 to the solenoid 130 of the electromagnetic clutch 110.

In the case where the checking in step SA3 reveals that the calculated vehicle speed V is greater than or equal to the predetermined value $V\alpha$, the CPU 164 executes step SA7 and the subsequent steps in order to control the electromagnetic clutch 110 such that a variation in the output torque of the engine 112 is absorbed by the clutch 110. The timer counter T is incremented in step SA7, and the content of the counter T is compared with a predetermined value $T\alpha$ in step SA8. The predetermined value $T\alpha$ determines the previously indicated sampling time during which the IGNITION and TORQUE VARIATION counters of the programmable counter 150 count the number of variations in the torque of the output shaft 126, and the number of ignitions of the engine 112, respectively. When the current content of the timer counter T has not yet reached the predetermined value Tα, the CPU 164 skips steps SA9–SA13, and goes to step SA6. In the case where the content of the counter T has reached the predetermined value Tα, step SA8 is followed by step SA9 wherein the IGNITION and TORQUE VARIATION counters (which have been turned on in step SA13) are turned off. More specifically, step SA9 is executed to terminate the sampling time during which the numbers of ignitions and torque variations are counted, and to store the IGNITION number data "Tig" and the TORQUE VARIATION number data "Tq" which are prepared based on the contents of the IGNITION and TORQUE VARIATION counters of the programmable counter 150.

In the next step SA10, the CPU 164 checks if the electromagnetic clutch 110 is placed in a condition in which it is possible to sufficiently absorb a variation in the output torque of the engine 112 with substantially no power loss. Described in more detail, the step SA10 is executed to check whether an absolute value of a difference between the IGNITION and TORQUE VARIATION number data "Tig" and "Tq" (stored in step SA9) is greater than or equal to a predetermined reference value $\Delta T^*$. This reference vlaue $\Delta T^*$ is determined by multiplying the IGNITION number data "Tig" by a constant k which is smaller than "1" ($\Delta T^* = \text{Tig} \times k$). If the absolute value of the above difference is less than the reference value $\Delta T^*$, it means that the amount of slip in the clutch 110 is not sufficient to allow the absorption of a variation in the engine 112. In this instance, the CPU 164 goes to step SA11 wherein the control voltage "Vcl" is updated by subtracting a predetermined value $\Delta V$ from the last value "Vcl$^{(n-1)}$". If the absolute value of the above difference is greater than or equal to the predetermined reference value $\Delta T^*$, it indicates that the amount of slip in the clutch 110 is sufficient to absorb the engine torque variation, but is too large to prevent excessive power loss in the clutch 110. In this condition, the CPU 164 goes to step SA12 in which the control voltage "VCl" is updated to add the predetermined value $\Delta V$ to the last value "Vcl$^{(n-1)}$".

After the control voltage "Vcl" has been determined as described above, step SA13 is executed to reset and then turn on the IGNITION and TORQUE VARIATION counters of the programmable counter 150. Step SA14 is followed by step SA14 to reset the timer counter T. It is noted that the timer counter T is constituted by the CPU 164 which executes a program for counting the predetermined sampling time, and is not shown in the drawing.

Figure 17:
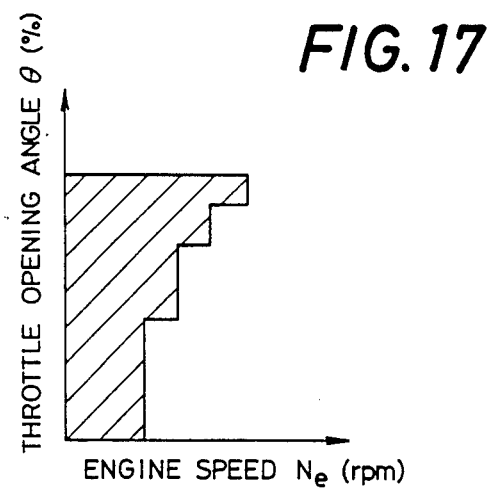
FIG. 17 is a view illustrating a relation between a throttle opening angle and an operating speed of the engine of the embodiment of FIG. 12, while the vehicle is running.

For higher fuel economy, it is desired that the engine 112 be operated at a relatively low speed and with a relatively high torque, as shown in the hatched area in FIG. 17. In a conventional arrangement wherein the engine power is faithfully transmitted to the vehicle drive wheels, the operation of the engine in the low-speed high-torque range of FIG. 17 will cause comparatively large variations in the output torque of the engine and therefore lead to reduced drivability or degraded driving comfort. Thus, the increase in the fuel economy of the engine may be enjoyed in the low-speed high-torque range, but at the sacrifice of the vehicle drivability.

Figure 18:
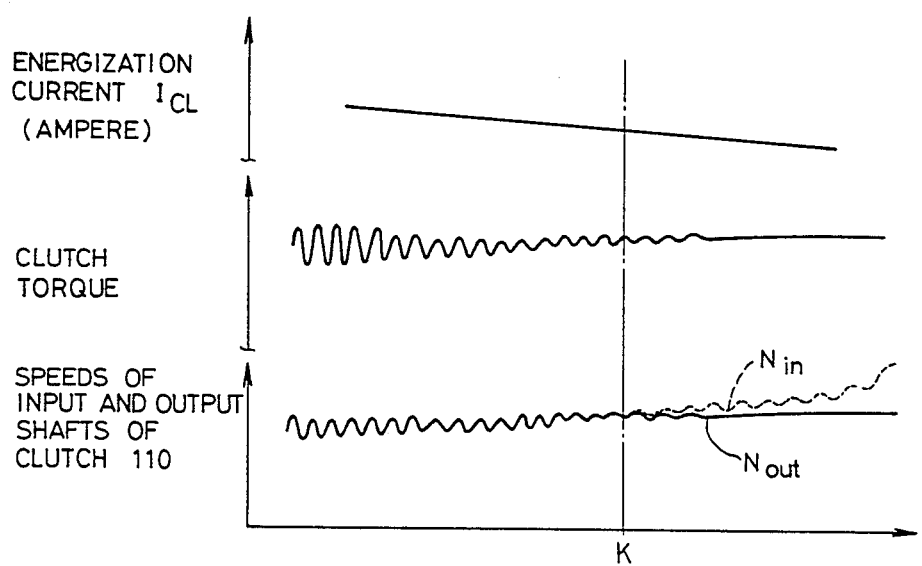
FIG. 18 is a graph illustrating the operating state of the electromagnetic clutch of FIG. 12.

In the meantime, the electromagnetic clutch 110 exhibits the current-torque characteristics as shown in FIG. 14. Because of this characteristics of the clutch 110, the clutch 110 has an increasing amount of slip between its input shaft (crankshaft 122) and its output shaft 126, as the energization current Icl to be applied to its solenoid 130 is reducd as shown in FIG. 18. As the amount of slip in the clutch 110 is increased, the magnitude of a variation in the transmission torque tends to be gradually decreased as indicated in the middle of FIG. 18. While the energization current Icl is relatively large, the rotating speeds "Nin" and "Nout" of the input and output shafts 122, 126 of the clutch 110 are varied periodically in synchronization with each other, as indicated at the bottom of FIG. 18. As the energization current is reduced, the force of coupling between the input and output shafts 122, 126 is gradually reduced and the clutch 110 begins to undergo a slip. With the current falling below a given limit, the periodic variation in the output speed "Nout" of the output shaft 126 disappears. However, the input speed "Nin" of the input shaft (crankshaft) 122 is increased relative to the output speed "Nout", while continuing the periodic variation. Therefore, it will be understood that there exits the most favorable condition, in the vicinity of a broken line K indicated in FIG. 18, in which the variation in the torque of the engine 112 is effectively absorbed by the clutch 110 and is not transferred to the output shaft 126, while at the same time the clutch 110 undergoes substantially no slip (between the input and output shafts 122, 126).

The present inventors found a phenomenon that, under the above-indicated condition, a difference between the number of combustions of the engine 112 per unit time, i.e., the number of ignitions "Tig" per unit time and the number of torque variations "Tq" of the output shaft 126 per unit time is constant provided the other conditions such as the speed of the engine 112 are constant. Accordingly, the transmission torque of the electromagnetic clutch 110 is controlled so that the difference between the number of ignitions "Tig" and the number of torque variations "Tq" coincides with the predetermined difference $\Delta T^*$ which is used in step SA10. In other words, the energization current Icl of the solenoid 130 is controlled so as to establish the most favorable condition as indicated by the broken line K in FIG. 18.

To control the energization current Icl, the control voltage Vcl to be applied to the output circuit 172 is determined in steps SA10–SA12. With the thus determined control voltage Vc1, the energization current Icl to be supplied from the output circuit 172 to the solenoid 130 is adjusted such that the difference between the IGNITION and TORQUE VARIATION number data "Tig" and "Tq" is equal to the predetermined difference $\Delta T^*$. In this way, the electromagnetic clutch 110 is held in the most favorable condition K or its vicinity. In this condition, the periodic variation in the output torque of the engine 112 is suitably absorbed or accommodated by the electromagnetic clutch 110, yet with minimum power loss, even while the engine 112 is operated in the range shown in FIG. 17. Hence, the vehicle equipped with an electromagnetic clutch controlled by the instant control device provides relatively high drivability as well as relatively high fuel economy.

Although the reference value ΔT* used in the instant embodiment is determined by multiplying the IGNITION number data "Tig" by a suitable factor "k", the reference value may be constant, or may be determined by the output torque of the engine as well as by the ignition number "Tig" (engine speed).

The programmable counter 150 of FIG. 12 may be replaced by a program which is stored in the ROM 166 and executed by the CPU 164 to attain the same function as performed by the counter 150.

While the present invention has been described in its preferred embodiments, it is to be understood that the invention is not confined to the precise disclosure contained herein, but may be otherwise embodied with various changes, modifications and improvements which may occur to those skilled in the art, without departing from the spirit and scope of the invention defined in the appended claims.

What is claimed is:

1. A method of controlling an electromagnetic clutch incorporated in a power transmission system of a vehicle to transmit an output of an engine to drive wheels of the vehicle, so as to absorb a variation in output torque of the engine, said method comprising the steps of:
   detecting a variation in rotating speed or torque of an output shaft of said electromagnetic clutch; and
   controlling an engaging action of said electromagnetic clutch to adjust a clutch torque transmitted by said clutch, based on whether the detected variation in rotating speed or torque of said output shaft of said electromagnetic clutch is synchronized with an ignition period of said engine.

2. An apparatus for controlling an electromagnetic clutch incorporated in a power transmission system of a vehicle to transmit an output of an engine to drive wheels of the vehicle, so as to absorb a variation in output torque of the engine, an engaging action of said electromagnetic clutch being controlled to adjust a clutch torque transmitted by said clutch such that said clutch torque is varied as a function of an amount of electric current applied to the electromagnetic clutch, said control apparatus comprising:
   detecting means for detecting a specific pattern of a variation in rotating speed of an output shaft of said electromagnetic clutch, the specific pattern being synchronized with an ignition period of said engine; and
   current adjusting means for controlling said amount of electric current so that the amount of electric current is decreased when said specific pattern of variation in rotating speed of said output shaft is detected by said detecting means, and increased when said specific pattern of variation is not detected by said detecting means.

3. An apparatus for controlling an electromagnetic clutch incorporated in a power transmission system of a vehicle to transmit an output of an engine to drive wheels of the vehicle, so as to absorb a variation in output torque of the engine, an engaging action of said electromagnetic clutch being controlled to adjust a clutch torque transmitted by said clutch such that said clutch torque is varied as a function of an amount of an electric current applied to the electromagnetic clutch, said control apparatus comprising:
   detecting means for detecting a specific pattern of variation in torque of an output shaft of said electromagnetic clutch, the specific pattern being synchronized with an ignition period of said engine; and
   current adjusting means for controlling said amount of electric current so that the amount of electric current is decreased when said specific pattern of variation in torque of said output shaft is detected by said detecting means, and increased when said specific pattern of variation is not detected by said detecting means.

4. A method of controlling an electromagnetic clutch incorporated in a power transmission system of a vehicle to transmit an output of an engine to drive wheels of the vehicle, so as to absorb a variation in output torque of said engine, said method comprising the steps of:
   detecting a frequency of variations in rotating speed or torque of an output shaft of said electromagnetic clutch;
   detecting an ignition frequency of said engine;
   comparing the detected frequency of variations in rotating speed or torque of said output shaft of said electromagnetic clutch, with the detected ignition frequency of said engine; and
   controlling an engaging action of said electromagnetic clutch to adjust a clutch torque transmitted by said clutch, based on whether the detected frequency of variations in rotating speed or torque of said output shaft is coincident with the detected ignition frequency of said engine.

5. An apparatus for controlling an electromagnetic clutch incorporated in a power transmission system of a vehicle to tranmit an output of an engine to drive wheels of the vehicle, so as to absorb a variation in output torque of said engine, an engaging action of said clutch being controlled to adjust a torque transmitted by said clutch such that said clutch torque is varied as a function of an amount of electric current applied to the electromagnetic clutch, comprising:
   first detecting means for detecting an ignition frequency of said engine;
   second detecting means for detecting a frequency of variations in rotating speed of an output shaft of said electromagnetic clutch; and
   current adjusting means for controlling said amount of electric current, said current adjusting means reducing said amount of electric current when said frequency of variations is coincident with said ignition frequency, and increasing said amount of electric current when said frequency of variations is not coincident with said ignition frequency.

6. An apparatus for controlling an electromagnetic clutch incorporated in a power transmission system of a vehicle to transmit an output of an engine to drive wheels of the vehicle, so as to absorb a variation in output torque of said engine, an engaging action of said clutch being controlled to adjust a clutch torque transmitted by said clutch such that said clutch torque is varied as a function of an amount of electric current applied to the electromagnetic clutch, comprising:
   first detecting means for detecting an ignition frequency of said engine;
   second detecting means for detecting a frequency of variations in torque of an output shaft of said electromagnetic clutch; and
   current adjusting means for controlling said amount of electric current, said current adjusting means reducing said amount of electric current when said frequency of variations is coincident with said ignition frequency, and increasing said amount of electric current when said frequency of variations is not coincident with said ignition frequency.

7. A method of controlling an electromagnetic clutch incorporated in a power transmission system of a vehicle to transmit an output of an engine to drive wheels of the vehicle, so as to absorb a variation in output torque of said engine, said method comprising the steps of:
  detecting the number of ignitions per unit time of said engine;
  detecting the number of variations per unit time in torque of an output shaft of said electromagnetic clutch;
  comparing the detected number of ignitions per unit time of said engine with the detected number of variations per unit time in torque of said output shaft; and
  controlling an engaging action of said electromagnetic clutch to transmit a clutch torque transmitted by said clutch, such that a difference between said detected number of ignitions of the engine and said detected number of variations in torque of said output shaft coincides with a predetermined reference value.

8. A method as recited in claim 7, wherein said number of variations per unit time in torque of said output shaft is counted each time a waveform representative of the torque of said output shaft exceeds a predetermined threshold level.

9. A method as recited in claim 7, wherein said predetermined reference value is determined so as to permit maximum absorption of said variation in output torque of said engine with substantially no power loss within said electromagnetic clutch.

10. A method as recited in claim 7, wherein said predetermined reference value is adjusted based on a speed of said engine.

11. An apparatus for controlling an electromagnetic clutch incorporated in a power transmission system of a vehicle to transmit an output of an engine to drive wheels of the vehicle, so as to absorb a variation in output torque of said engine, an engaging action of said clutch being controlled to adjust a clutch torque transmitted by said clutch such that said clutch torque is varied as a function of an amount of electric current applied to the electromagnetic clutch, comprising:
  first detecting means for detecting the number of ignitions per unit time of said engine;
  second detectinutch, comprising:
  first detecting means for detecting the number of ignitions per unit time of said engine;
  second detecting means for detecting the number of variations per unit time in torque of an output shaft of said electromagnetic clutch; and
  current adjusting means for controlling said amount of electric current such that a difference between said number of ignitions of the engine and said number of variations in torque of said output shaft coincides with a predetermined reference value.

* * * * *